Figure 1:
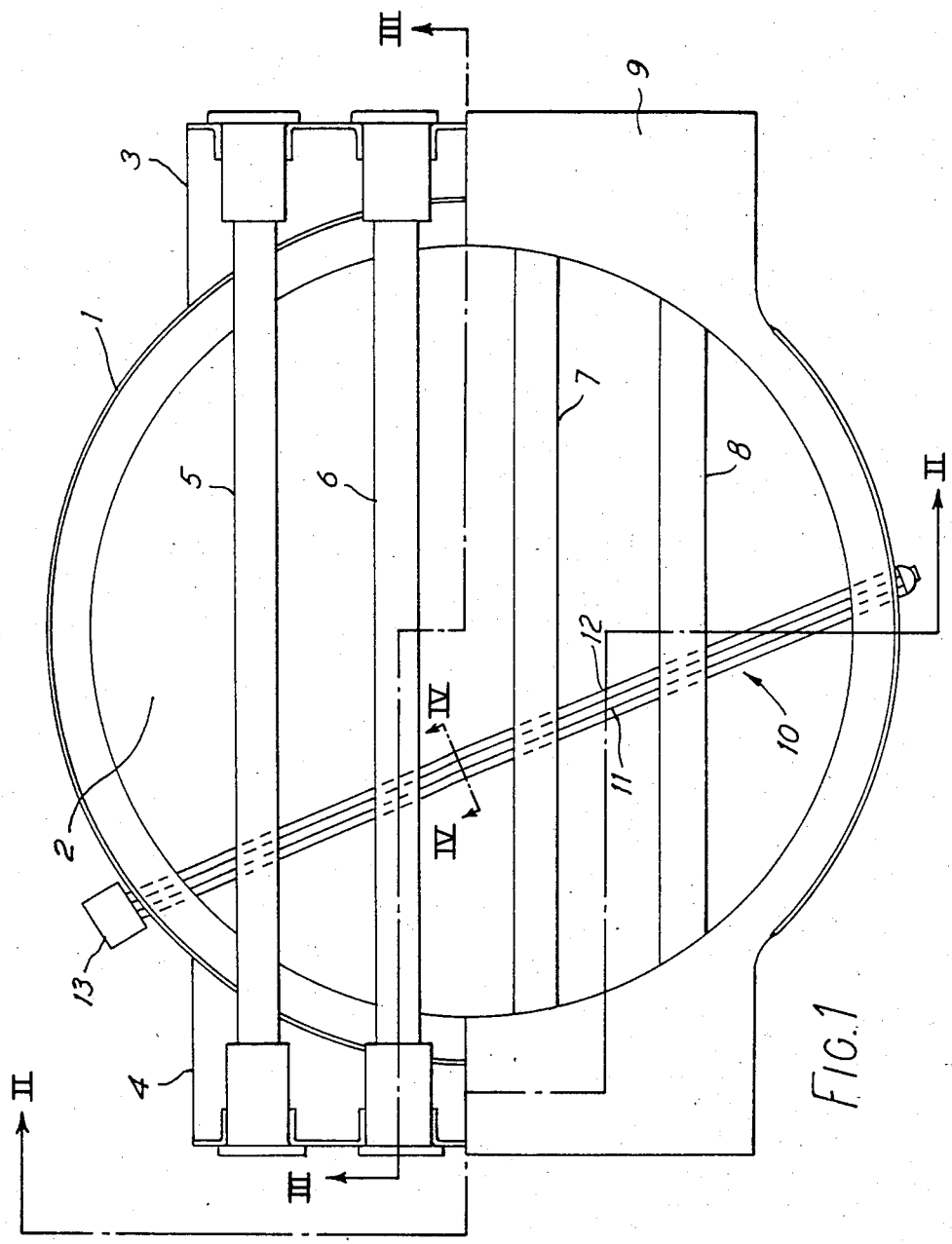

United States Patent [19]

Crossley et al.

[11] Patent Number: 4,631,390

[45] Date of Patent: Dec. 23, 1986

[54] THERMAL LIMITER

[75] Inventors: Peter W. Crossley, Havant; Bernard F. Fellerman, Hayling Island; Graham H. Goodchild, Portchester, all of England

[73] Assignee: THORN EMI Domestic Appliances Limited, London, England

[21] Appl. No.: 661,295

[22] Filed: Oct. 15, 1984

[30] Foreign Application Priority Data

Dec. 1, 1983 [GB] United Kingdom ............... 8332087
Jan. 24, 1984 [GB] United Kingdom ............... 8401799

[51] Int. Cl.$^4$ .............................................. H05B 3/72
[52] U.S. Cl. .................................. 219/449; 337/394; 219/512
[58] Field of Search ............... 219/343, 354, 405, 411, 219/446, 449, 460, 461, 462, 464, 468, 512; 313/278, 313, 318, 315; 337/386, 393, 394; 338/238

[56] References Cited

U.S. PATENT DOCUMENTS

| | | | |
|---|---|---|---|
| 2,469,801 | 5/1949 | Vogel et al. | 338/240 |
| 2,799,748 | 7/1957 | Stump | 337/394 X |
| 2,816,200 | 12/1957 | Mudge | 338/238 X |
| 2,836,698 | 5/1958 | Fry | 219/461 X |
| 2,910,605 | 10/1959 | Hodge | 219/553 |
| 3,355,574 | 11/1967 | Bassett et al. | 219/464 |
| 3,364,378 | 1/1968 | Beesley | 313/315 |
| 3,663,798 | 5/1972 | Speidal et al. | 219/464 |
| 3,732,518 | 5/1973 | Them et al. | 337/394 |
| 3,735,185 | 5/1973 | Bonazoli et al. | 313/315 X |
| 4,135,081 | 6/1979 | Fischer | 219/449 |
| 4,350,875 | 9/1982 | McWilliams | 219/449 |

FOREIGN PATENT DOCUMENTS

| | | | |
|---|---|---|---|
| 2748109 | 5/1979 | Fed. Rep. of Germany | 219/449 |
| 3100758 | 9/1982 | Fed. Rep. of Germany | 219/449 |
| WO85/01412 | 3/1985 | PCT Int'l Appl. | |
| 2132060A | 6/1984 | United Kingdom | |

OTHER PUBLICATIONS

Electrovac Brochure, Electrovac Gesellschaft m.b.H., Rampengrasse 5, A-1194, Wien, Austria, 1/1984.
New Product Bulletin, Thermo-Disc, Incorporated, Mansfield, OH, 7/25/83.

Primary Examiner—E. A. Goldberg
Assistant Examiner—Teresa J. Walberg
Attorney, Agent, or Firm—Fleit, Jacobson, Cohn & Price

[57] ABSTRACT

A thermal limiting device for controlling one or more sources of infra-red radiation, preferably tungsten-halogen lamps, mounted in heating apparatus, consists of a metallic wire arranged to de-energize the sources when it is subjected to a predetermined temperature. The wire is accommodated within a quartz tube, which selectively transmits and absorbs infra-red radiation of different wavelengths. An infra-red reflective coating is applied either to the wire or to the inner surface of the quartz tube to prevent infra-red radiation transmitted through the quartz tube from reaching the wire, while infra-red radiation of a particular wavelength, which is absorbed by the quartz tube, heats the wire by thermal conduction and convection, so that the limiter is primarily responsive to radiation only of that particular wavelength.

7 Claims, 5 Drawing Figures

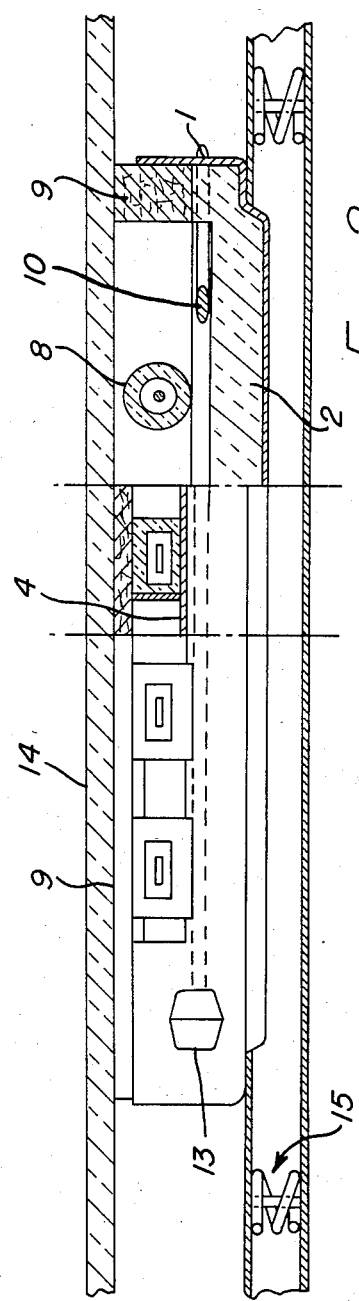
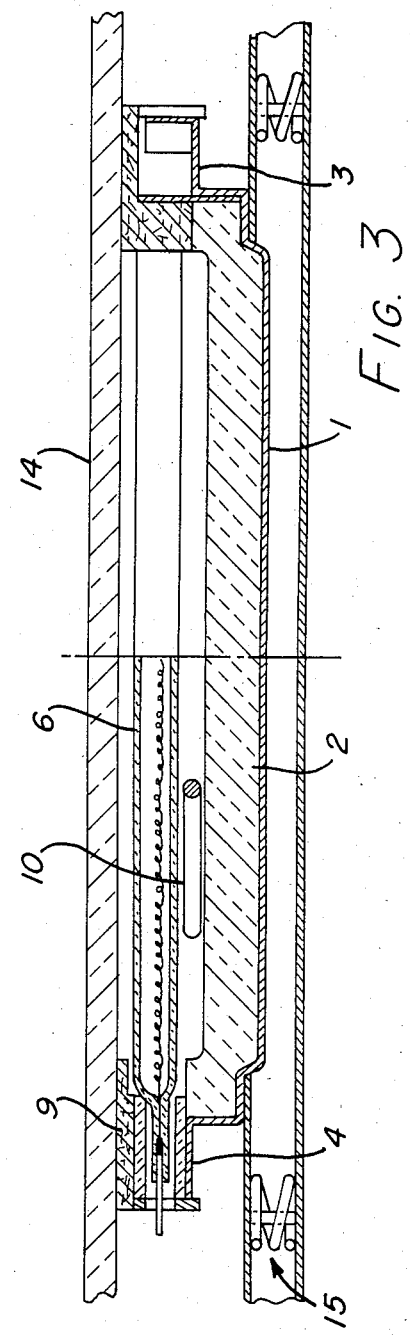

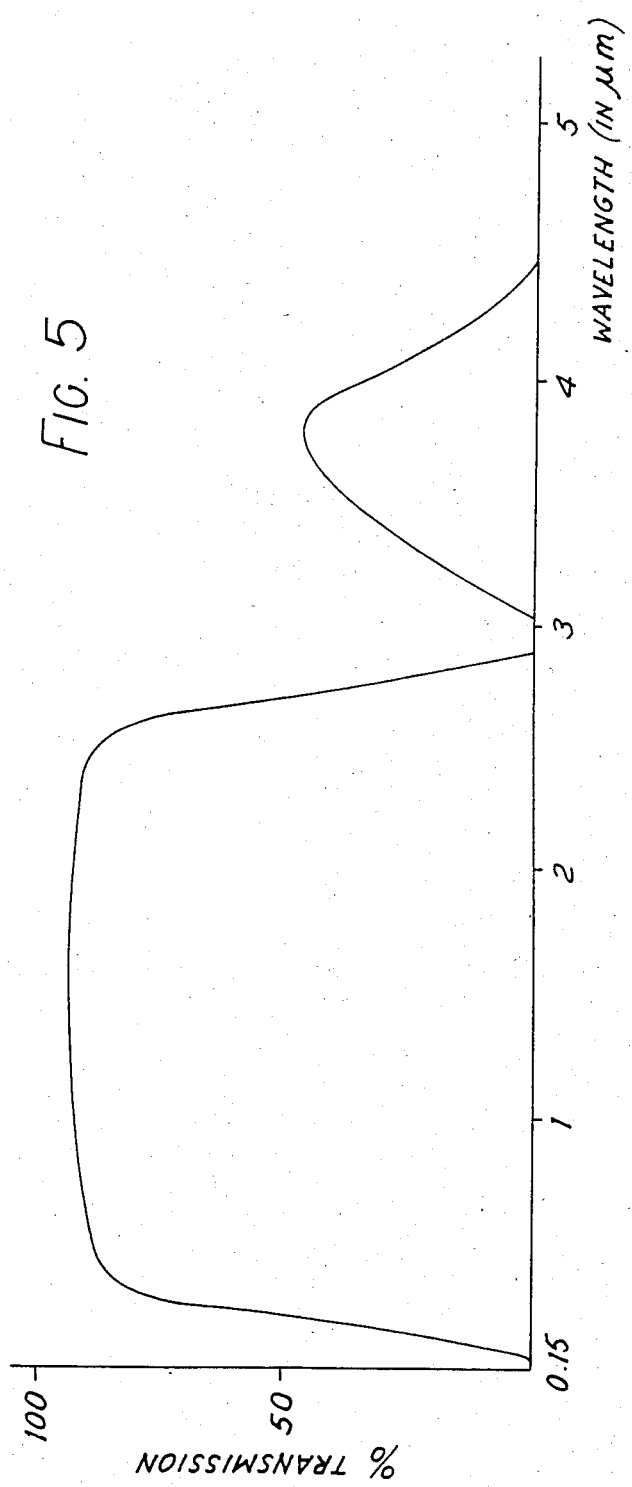

THERMAL LIMITER

This invention relates to a thermal limiting device and in particular, though not exclusively, to such a device for controlling power supplied to one or more sources of infra-red radiation mounted in heating apparatus of the kind described in our co-pending U.K. Patent Application No. 8320717.

The heating apparatus disclosed in U.K. Patent Application No. 8320717 consists of, in one example, a shallow tray member containing thermally-insulative material and supporting four infra-red-emitting, tungsten-halogen lamps. The tray member, usually along with a number of similar members, is mounted beneath a layer of glass ceramic, so as to form a cooking hob.

It is necessary to ensure that the operating temperature of the undersurface of the glass ceramic layer does not exceed a maximum value of approximately 700° C. The heating apparatus described in the afore-mentioned application therefore incorporates a thermal limiting device including a metallic wire, which is arranged to activate a microswitch when the maximum operating temperature of the glass ceramic is reached, so as to disconnect the power supply to the infra-red lamps.

However, it has been found that when a utensil having a shiny, reflective base is disposed on the glass ceramic, infra-red radiation transmitted through the glass ceramic may be reflected from said base and thus be incident on the device. Moreover, a reflective layer, which may be deposited on the thermally-insulative material, may also reflect infra-red radiation towards the limiter. The thermal limiter therefore tends to receive this reflected radiation, in addition to the radiation which is actually absorbed and re-radiated by the glass ceramic layer, so that the amount of radiation that the limiter receives is not correctly indicative of the actual temperature of the glass ceramic.

It is therefore an object of the present invention to provide an improved thermal limiting device of the afore-mentioned type.

According to the present invention there is provided a thermal limiting device for controlling power supplied to one or more sources of infra-red radiation mounted in heating apparatus, said device including a metallic wire member accommodated within a tubular member, said wire member being arranged, when subjected to a predetermined temperature, to disconnect said power to said source or sources, said tubular member being capable of selectively transmitting and absorbing infra-red radiation of different wavelengths, and said device further including an infra-red reflective coating to prevent radiation transmitted through said tubular member from reaching said wire member.

In one embodiment, a coating, either on the wire or on a quartz tube surrounding it, is used to act as a reflector to reflect radiation transmitted through the quartz tube and incident on the coating, thereby preventing the wire from expanding and activating the microswitch. It has surprisingly been found that the quartz tube selectively transmits and absorbs radiation of different wavelengths, so that it transmits radiation in a first band of wavelengths emitted from the lamps, whilst absorbing radiation in a second band of wavelengths, which has been absorbed by, and re-radiated from, the glass ceramic layer, this latter condition causing expansion of the wire by thermal conduction and convection, so as to cause the wire to de-energise the infra-red-emitting lamps.

The amount of heat the wire thus receives is more closely indicative of the actual temperature of the glass ceramic.

Figure 4:
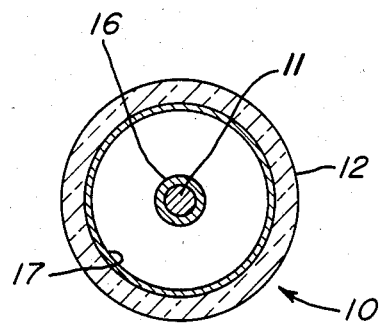

The invention will now be further described by way of example only with reference to the accompanying drawings, wherein:

FIG. 1 shows one embodiment of the invention incorporated in one example of heating apparatus disclosed in our afore-mentioned Application No. 8310717, FIG. 2 shows a sectional view along II—II of the embodiment shown in FIG. 1 mounted beneath a glass ceramic layer, FIG. 3 shows a sectional view along III—III of the embodiment shown in FIG. 1 mounted beneath a glass ceramic layer, FIG. 4 shows an enlarged view along IV—IV in FIG. 1, and FIG. 5 shows schematically a characteristic transmission curve of the preferred quartz material, such as Spectrosil or Spectrosil WF.

FIGS. 1 to 3 show heating apparatus comprising a generally circular metallic tray 1, within which a layer 2 of thermally-insulative material is deposited. the tray 1 has two oppositely-extending flanges, 3 and 4, which support four infra-red-emitting lamps, 5 to 8, disposed in a parallel arrangement across the circular region of the tray 1. A moulding 9 of ceramic fibre material is press-fitted around ceramic and caps enclosing the ends of the lamps, 5 to 8, and preferably four of such apparatuses are disposed below a layer of glass ceramic 14 by a suitable mounting arrangement, shown generally at 15, so as to form a cooking hob.

A thermal limiting device, shown generally at 10, is located in any suitable orientation, either below or at the same level as the lamp, 5 to 8, to limit the operating temperature of the glass ceramic. The device 10 consists of a metallic wire 11, preferably formed from the material known as Hastalloy X, a nickel alloy, disposed within a quartz tube 12. The wire 11 is arranged to activate a microswitch 13, which disconnects power supplied to the lamps, 5 to 8, when the maximum operating temperature of approximately 700° C. of the glass ceramic is teached.

To this end, as shown in FIG. 4, the present invention provides a reflective coating, either on the wire as at 16 or on the inner surface of the tube, as at 17, which is capable of reflecting infra-red radiation.

FIG. 5 shows schematically a characteristic transmission curve of the quartz material, from which the tube of the limiter is formed. It can be seen that the quartz has a transmission band in the range of approximately 0.15–3 $\mu$m and has an absorption band above approximately 4.5 $\mu$m. The infra-red radiation emitted from the lamps, which is subsequently reflected from a shiny, reflective base of a utensil disposed on the glass ceramic and/or from a reflective layer disposed on the thermally-insulative material below the lamps, lies in a band centered on a wavelength of approximately 1.2 $\mu$m. As this band of wavelengths is within the transmission band of the quartz, the quartz tube transmits this radiation and the transmitted radiation is then reflected by the coating either on the inner surface of the tube or on the wire, thereby preventing the wire from being heated and thus from expanding.

The re-radiated radiation, which has been absorbed by the glass ceramic, lies however in a band including wavelengths greater than 4.5 μm and therefore falls within the quartz absorption band, thereby causing the quartz tube to absorb this radiation, the amount of such radiation absorbed being indicative of the actual temperature of the glass ceramic.

The absorbed radiation consequently heats the wire by thermal convection and conduction, thereby enabling the wire to expand and activate the microswitch when the maximum operating temperature of the glass ceramic is reached.

The wire of the thermal limiting device is therefore rendered substantially insensitive to radiation either direct from the lamps, reflected from the shiny undersurface of a utensil disposed on the glass ceramic, or reflected from a reflecltive layer deposited on the thermally-insulative material disposed beneath the infra-red lamps. The wire however remains sensitive to radiation which has been absorbed by the glass ceramic and re-radiated at a greater wavelength.

The reflective coating may be in the form of three respective layers of nickel or copper, silver, and gold or rhodium, deposited on the surface of the wire 11. The copper or nickel layer merely provides a good deposition surface for the silver layer and may be omitted if preferred.

It may be preferably to employ a layer of rhodium instead of a gold layer, rhodium possessing similar emissivity properties to gold, but having an additional advantage of achieving the effect of preventing sulphide formation on the silver layer.

Further elements which may be suitable alternatives to the gold layer include platinum, palladium and iridium.

Alternatively, the gold layer may be omitted, the wire merely being coated with respective nickel and silver layers.

Preferably, the thicknesses of the layers are approximately $5 \propto 15$ μm for silver, approximately 2 μm for gold and a thin strike for nickel.

In an alternative embodiment of the present invention, a reflective gold or silver coating may be deposited on the inner surface of the quartz tube 12, this coating acting in substantially the same manner as the coating on the wire to achieve the required operation of the device, so that the infra-red lamps, 5 to 8, are de-energized at the predetermined maximum operating temperature of the glass ceramic.

The gold coating on the quartz tube 12 may be deposited on the inner surface, in one example, by painting a mixture of liquid gold and an organic substance on the inner surface of the tube and then baking on this layer, so as to remove the organic substance therefrom.

The silver coating may be in the form of a silver mirror deposited on the inner surface of the quartz tube.

At high temperatures, a silver coating deposited on the wire may tarnish and, in this respect, a silver coating on the inner surface of the tube may be advantageous, because the outwardly-facing, actively-reflective surface of the coating is protected by the quartz tube.

However, if the nickel/silver/gold combination is preferred, it may be necessary to ensure against contamination resulting from absorption of hydrogen into the nickel layer and thus affecting the outer layers of silver and gold. The problem of contamination may be overcome by depositing the nickel layer in accordance with a technique known as "Wood's Process", which involves flashing on the nickel from a bath of nickel chloride, wherein the wire is firstly made an anode for approximately 30 secs. and then the polarity thereof is reversed for approximately 60 secs. The nickel-coated wire is then washed and rinsed in distilled water and transferred to a silver plating bath. The wire may then be gold-plated if preferred.

An alternative suitable process for plating the wire with respective layers of nickel, silver and gold consists of the following stages:

Stage 1

The wire is degreased preferably using a two-staged degreaser, such as Trichloroethylene Genclene or Arklone, incorporating a hot liquid and vapour phase degrease.

Stages 2 and 3

The wire is soaked and electrocleaned using a cleaner, such as Circuitprep 125 EC, at a temperature of 35° C. (±5° C.) and at a concentration of 75 g/l. The soaking time is 5 minutes and the electroclean time is 2.5–3.5 minutes, cathodic at 3–4 Amps ASD.

Stage 4

The wire is rinsed.

Stage 5

It is acid dipped, preferably in Circuitprep 40, at a concentration of 100–150 g/l, preferably 125 g/l, for 3 minutes at 30°–35° C.

Stage 6

The wire is again rinsed.

Stages 7 and 8

The wire is back-etched and plated, in accordance with Woods Nickel Strike, using nickel chloride at a concentration of 240 g/l and Hydrochloric acid at a concentration of 86 ml/l. These stages are carried out at room temperature with current densities of 3 Amp/dm sq cathodic for 3–4 minutes and 2 Amp/dm sq anodic for 20 seconds. The level of iron contamination should not rise above 1 g/l.

Stage 9

The wire is again rinsed.

Stage 10

A silver strike is applied using silver potassium cyanide at 2.5 g/l and potassium cyanide at 60 g/l. This is implemented at room temperature with a current density of 1 ASD for 15–30 seconds.

Stage 11

A silver plating is applied using Silvadex II, containing silver metal as 32 g/l and potassium cynanide at 90–150 g/l (preferably 120 g/l), with a cathodic current density of 1 Amp/dm sq at a maximum room temperature of 28° C. For a plating thickness of 15 μm, the time is approximately 22.5 minutes.

Stage 12

The silver plated wire is rinsed in cold water.

Stage 13

A gold strike is applied to the wire using Aurobond TN, having a gold concentration of 1.5–2.5 g/l (preferably 2 g/l), a minimum density of 8 deg. Beaume, a pH value of 3.4–3.7 (preferably 3.5), at a temperature of 45°–55° C. (preferably 50° C.) for 30 seconds (±10 seconds) at a current density of 1 ASD.

Stage 14

The wire is gold-plated using Pur-A-Gold 402 having a gold concentration of 8 g/l, a pH value of 6.5–7.5 (preferably 7), a minimum density of 10 deg. Beaume, at a temperature of 50° C. with a cathodic current density of 0.3 Amp/dm sq. For a plating of 2 μm thickness, the plating time is approximately 11.5 minutes with vigorous agitation.

Stages 15, 16 and 17

The plated wire then undergoes a rinse drag out, a rinse and a hot water rinse using fresh water at 50° C.

Any suitable deposition technique, such as vacuum deposition, may of course alternatively be used, in accordance with the present invention, to apply the reflective coating to either the wire or the quartz tube.

Alternatively, the infra-red reflective coating may be applied to the inner surface of the quartz tube by ion bombardment.

As an alternative to a metallic infra-red reflective coating, a non-metallic coating, such as a ceramic material, may be utilised.

The thermal limiting device, in accordance with the present invention, may of course be utilised to control the power supplied to alternative sources of infra-red radiation, such as conventional wire-wound resistive heating elements, for example.

We claim:

1. A thermal limiting device for controlling energization of at least one source of infra-red radiation mounted in heating apparatus, said device comprising:
   a tubular member having an annular wall formed from a material transmissive of infra-red radiation of a first wavelength and absorptive of infra-red radiation of a second wavelength, said wall defining an inner surface of said member,
   a wire member accommodated within said tubular member and formed from a material of higher thermal expansion than said material of said tubular member,
   switching means, for de-energising said at least one source,
   means securing said wire member, said tubular member and said switching means relative to each other, such that said switching means is operable by thermal expansion of said wire member, and
   a coating of material reflective of infra-red radiation, provided on one of said wire member and said inner surface,
   whereby infra-red radiation of aid first wavelength transmitted through said wall is reflected back out of said tubular member by said coating and infra-red radiation of said second wavelength absorbed by said tubular member causes heating, and thus thermal expansion, of said wire member to operate said switching means.

2. A device as claimed in claim 1 wherein said tubular member is formed from a quartz material.

3. A device as claimed in claim 1 wherein said coating comprises a layer of silver overlying a layer of nickel.

4. A device as claimed in claim 3 wherein said coating coprises a layer of gold overlying said layer of nickel.

5. A heating unit comprising:
   at least one source of infra-red radiation,
   a mass of thermally-insulative material,
   support means supporting said at least one source and said thermally-insulative material in a desired configuration relative to each other,
   a thermal limiting device for controlling energisation of said at least one source, and
   means mounting said device relative to said at least one source,
   said device comprising a tubular member having an annular wall formed from a material transmissive of infra-red radiation of a first wavelength and absorption of infra-red radiation of a second wavelength, said wall defining an inner surface of said member, a wire member accommodated within said tubular member and formed from a material of higher thermal expansivity than said material of said tubular member, switching means, for de-energising said at least one source, means securing said wire member, said tubular member and said switching means relative to each other, such that said switching means is operable by thermal expansion of said wire member, and a coating of material reflective of infra-red radiation, provided on one of said wire member and said inner surface,
   whereby infra-red radiation of said first wavelength transmitted through said wall is reflected back out of said tubular member by said coating and infra-red radiation of said second wavelength absorbed by said tubular member causes heating, and thus thermal expansion, of said wire member to operate said switching means.

6. A unit as claimed in claim 5 wherein said at least one source comprises a plurality of infra-red-emissive lamps, each of said lamps comprising a tubular quartz envelope and a tungsten filament accommodated within said envelope.

7. A cooking hob comprising:
   at least one heating unit, each including at least one source of infra-red radiation and a thermal limiting device for controlling energisation of said at least one source,
   a layer of material transmissive of infra-red radiation generated by said at least one source, and
   means mounting said at least one heating unit adjacent the underside of said layer, to heat at least one selected region of said layer,
   said device comprising a tubular member having an annular wall formed from a material transmissive of infra-red radiation of a first wavelength generated by said at least one source and absorptive of infra-red radiation of a second wavelength radiated from said layer, said radiated radiation being indicative of the temperature of said layer, a wire member accommodated within said tubular member and formed from a material of higher thermal expansivity than said material of said tubular member, switching means for de-energising said at least one source, means securing said wire member, said tubular member and said switching means relative to each other, such that said switching means is operable by thermal expansion of said wire member, and a coating of material reflective of infra-red radiation, provided on one of said wire member and said inner surface,
   whereby infra-red radiation of said first wavelength transmitted through said wall is reflected back out of said tubular member by said coating and infra-red radiation of said second wavelength absorbed by said tubular member causes heating, and thus thermal expansion, of said wire member to operate said switching means.

* * * * *